United States Patent [19]
Roush, Jr.

[11] Patent Number: 5,119,765
[45] Date of Patent: Jun. 9, 1992

[54] ANIMAL FEEDER

[76] Inventor: Ben W. Roush, Jr., 6819 Hunterdon Cove, Fort Wayne, Ind. 46835

[21] Appl. No.: 743,864

[22] Filed: Aug. 12, 1991

[51] Int. Cl.⁵ .......................................... A01K 39/014
[52] U.S. Cl. .................................. 119/57.91; 119/61
[58] Field of Search .................. 119/57.91, 57.8, 57.9, 119/61, 51.03, 51.01

[56] References Cited

U.S. PATENT DOCUMENTS

| | | | |
|---|---|---|---|
| 1,355,399 | 10/1920 | Kelley | 119/57.91 |
| 2,660,981 | 12/1953 | Jorenby | 119/61 |
| 2,801,611 | 8/1957 | Decker | 119/57.8 |
| 3,145,007 | 8/1964 | Swinney | 119/57.9 |
| 3,174,459 | 3/1965 | Browne | 119/57.8 |
| 3,537,429 | 11/1970 | Regan | 119/51.03 |
| 4,215,652 | 8/1980 | Kerscher | 119/57.8 |
| 4,632,062 | 12/1986 | Hubbard | 119/51.03 |
| 4,823,738 | 4/1989 | Gold | 119/51.01 |

Primary Examiner—Paul J. Hirsch
Attorney, Agent, or Firm—George Pappas

[57] ABSTRACT

An animal feeder for feeding squirrels or other similar small wild animals includes a pivotally mounted hollow tube having a reservoir therein for containing granular food, and open ends. As the squirrels climb about on the feeder, they cause it to tip back and forth in "teeter-totter" fashion, with each tipping of the tube causing a small portion of food to be dispensed from the reservoir through the open end of the tube. Exchangeable metering diaphragms having metering apertures therethrough partially occlude the open ends of the hollow tube to restrict the amount of food dispensed with each "teetering" of the tube. The metering apertures are sized and arranged in accordance with the dry flow characteristics of the granular food used. Transparent windows are provided in the tube so that the squirrels can see the food therein.

20 Claims, 2 Drawing Sheets

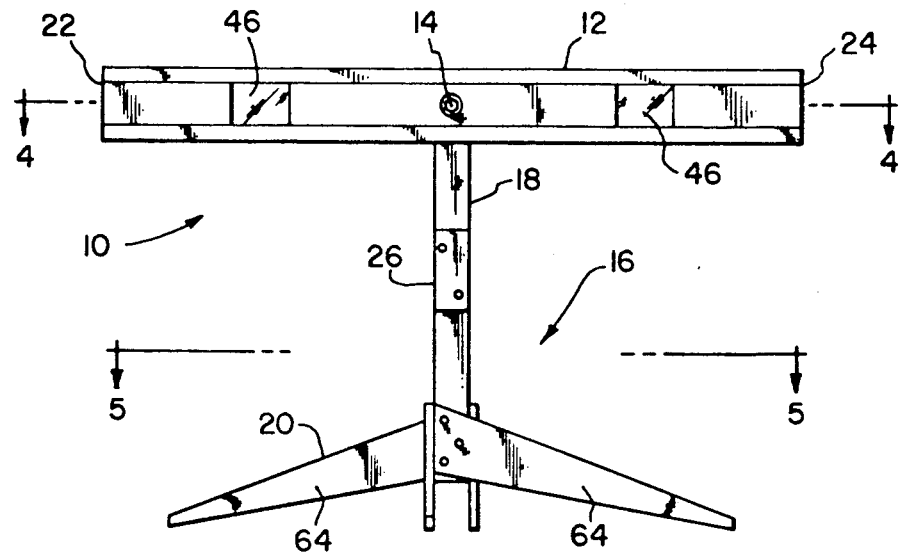
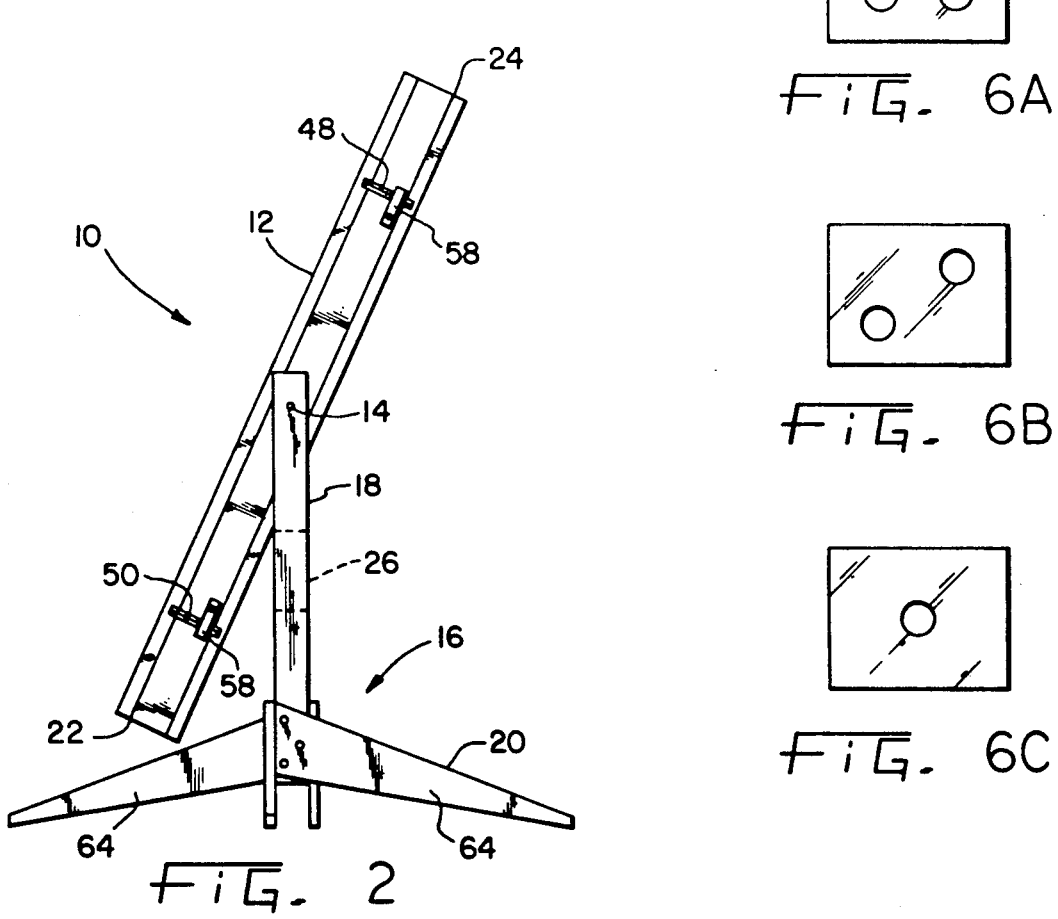

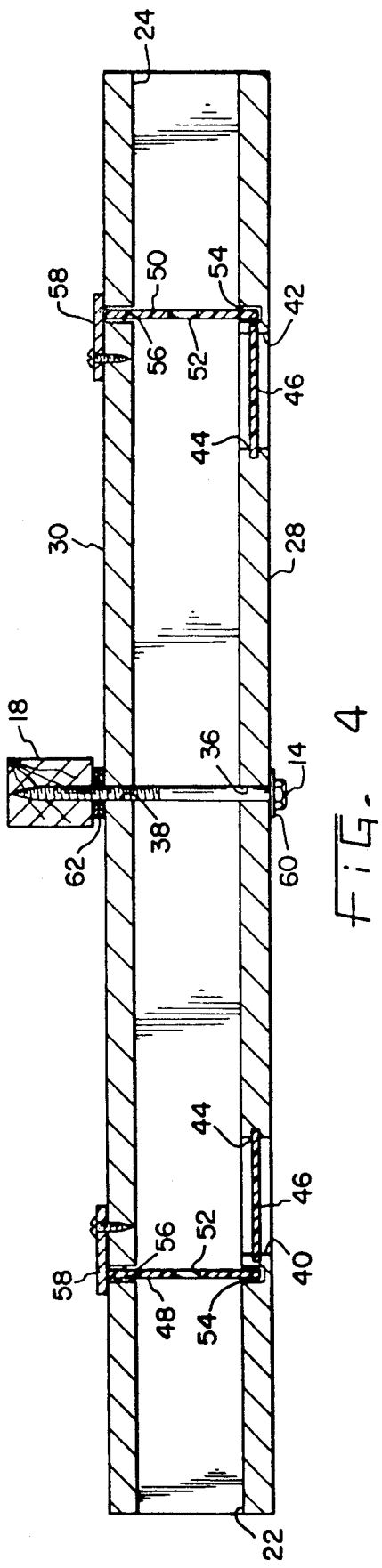
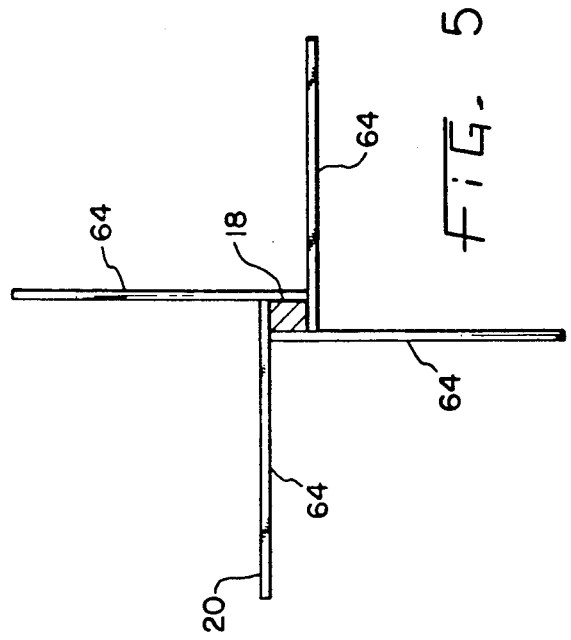
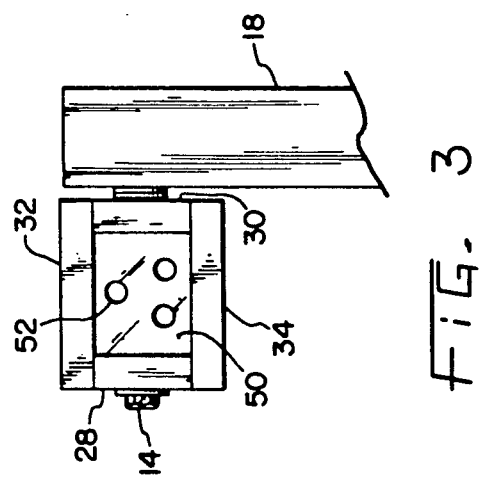

1

ANIMAL FEEDER

BACKGROUND OF THE INVENTION

1. Field of the Invention

The present invention relates generally to animal feeders and more specifically to animal feeders for dispensing food to small wild animals while also providing play for the animals and amusement for human spectators.

2. Description of the Related Art

Small wild animals such as squirrels are often active and playful as they feed, and many people find them enjoyable and amusing to watch. Therefore, it has become popular to provide feeders loaded with grains and seeds and other foods near human dwellings in order to attract squirrels and other animals to a place where they can be easily observed. In addition to conventional feeders that merely provide a reservoir of food at a convenient location, other feeders have been proposed that require an increased level of action by the small animals to extract the food, which provides both a source of play for the animals and a source of amusement for their human observers.

An action feeder is described in U.S. Pat. No. 3,537,429, issued Nov. 3, 1970, to Gerald D. Regan. The feeder includes a vertically disposed disc mounted to a tree for rotation about a horizontal axis. A plurality of spikes project laterally from the disc near the perimeter and extend parallel to the axis of rotation. An ear of corn is impaled on each spike. As the squirrels attempt to feed from the ears of corn, they unavoidably cause to the disc to rotate, which leads to a variety of interesting action.

Another action feeder is described in U.S. Pat. No. 4,632,062, issued Dec. 30, 1986, to Jack E. Hubbard. The feeder includes an elongate bar mounted for pivotal rotation about a horizontal axis intermediate the ends of the bar. An ear of corn is affixed to one end of the bar, and the pivot axis is located nearer one end of the bar than the other. As a squirrel climbs on the bar to get to the ear of corn, his body weight causes the bar to rotate, whereupon the squirrel is made to swing in an arc as he clings to the rotating bar.

Since a variety of foods that appeal to squirrels and other small animals are available in granular form, such as seeds and grains, it would be desirable to provide an action feeder that can hold and dispense granular type foods in response to the action of the animals, while still providing a high level of play for the animal.

The present invention fulfills this and other desires, and has additional advantages that will be apparent from the following descriptions of the invention and from the description of a preferred embodiment.

SUMMARY OF THE INVENTION

The present invention generally involves an animal feeder for feeding squirrels or other similar small wild animals that provides play for the animals and entertainment for human observers. The invention includes a pivotally mounted hollow tube having a reservoir therein for containing granular food, and open ends. As the squirrels climb about on the feeder, they cause it to tip back and forth in "teeter-totter" fashion, with each tipping of the tube causing a small portion of food to be dispensed from the reservoir through the open end of the tube.

In terms of a preferred embodiment of the invention, an animal feeder includes a support frame, an elongate hollow tube having a food reservoir portion and a pair of opposite open ends communicating with the food reservoir portion, and a pivot connecting the hollow tube to the support frame for permitting pivotal motion of the hollow tube relative to the support frame about a substantially horizontal pivot axis disposed substantially transverse to the hollow tube and intermediate the open ends of the tube.

It is an object of the present invention to provide an improved squirrel or small animal feeder that dispenses granular food.

It is another object of the present invention to provide an improved squirrel or small animal feeder that provides play for the animals and amusement for human observers of the animals.

It is yet another object of the present invention to provide an improved squirrel or small animal feeder that is adaptable to handle a variety of granular foods.

Further objects and advantages of the present invention will be apparent from the following descriptions and drawings of a preferred embodiment, and from the claims appended hereto.

BRIEF DESCRIPTION OF THE DRAWINGS

FIG. 1 is a front elevational view of an animal feeder in accordance with the present invention.

FIG. 2 is a rear elevational view of the animal feeder of FIG. 1, showing the reservoir in a tipped orientation.

FIG. 3 is an end view of the animal feeder of FIG. 1.

FIG. 4 is a cross-sectional view of the animal feeder of FIG. 1 taken along section plane 4—4 and viewed in the direction of the arrows.

FIG. 5 is cross-sectional view of the animal feeder of FIG. 1 taken along section plane 5—5 and viewed in the direction of the arrows.

FIG. 6A is an elevational view of a first embodiment of a metering diaphragm useful in connection with the animal feeder of FIG. 1.

FIG. 6B is an elevational view of a second embodiment of a metering diaphragm useful in connection with the animal feeder of FIG. 1.

FIG. 6C is an elevational view of a third embodiment of a metering diaphragm useful in connection with the animal feeder of FIG. 1.

DESCRIPTION OF THE PREFERRED EMBODIMENT

Referring to FIGS. 1 and 2 of the drawings, there is illustrated an animal feeder 10 configured in accordance with the present invention. Animal feeder 10 comprises an elongate tube 12 pivotally mounted by pivot bolt 14 to a support frame 16, with the support frame 16 including an upright post 18 and a base 20. Tube 12 is hollow and is open at each end 22 and 24. The hollow interior of tube 12 comprises a food reservoir, and is in communication with the open ends 22, 24. Pivot bolt 14 passes through approximately the midpoint of tube 12 intermediate open ends 22 and 24, substantially horizontally and transverse to the longitudinal axis of tube 12. Tube 12 as so mounted is able to pivot about the horizontal pivot axis of pivot bolt 14 relative to stationary frame 16. A stop block 26 mounted to upright post 18 below pivot bolt 14 extends into the path of pivotal motion of tube 12 in order to limit the range of motion of tube 12. The hollow tube 12 is able to "teeter-totter", but is prevented from making a complete revolution about the pivot axis.

With particular reference to FIGS. 1-4, tube 12 is constructed as an elongate box of substantially square cross-sectional shape. The preferred material for tube 12 is rough sawn cedar wood, but other materials such as plastics or metals could be used. For the purpose of describing the relative orientations of the several parts comprising tube 12, descriptive terms such as "vertical" are used below. It should be understood that such orientational references are made with the assumption that the longitudinal axis of tube 12 is disposed horizontally, as per FIG. 1, even though in operation tube 12 may not necessarily be in such an orientation at any given time. Tube 12 includes a pair of vertical spaced sidewalls 28 and 30, spanned and overlapped by an abutting top wall 32 and an abutting bottom wall 34. Walls 28-34 are joined together in the preferred embodiment by staples, but can be joined together by any conventional wood joining means, such as nails, screws, dowels, tongue and groove, glue, or the like. Front side wall 28 and rear side wall 30 define pivot holes 36 and 38, respectively, therethrough. Pivot holes 36 and 38 are aligned with one another along a pivot axis passing transversely through tube 12 about halfway between open ends 22 and 24, and at about the vertical midpoint of side walls 28 and 30. Since walls 28-34 are of substantially constant dimensions along their entire length, the pivot axis passes through approximately the balance point of tube 12, such that tube 12, when empty, does not tend to rotate in one direction or the other about pivot bolt 14, but rather tends to remain in whatever orientation it is placed.

Front wall 28 is interrupted in two places by rectangular openings 40 and 42, which in the preferred embodiment extend from top wall 32 to bottom wall 34. Each of the vertical edges of openings 40 and 42 includes a vertical slot 44 in the end face thereof, each slot extending horizontally into front wall 28 parallel to the plane of front wall 28. Received within vertical slots 44 and extending therebetween within each opening 40 and 42 is a transparent plastic pane 46 which closes the respective opening 40 or 42 in which it is disposed. The top and bottom horizontal edges of each pane 46 abut against top wall 32 and bottom wall 34, respectively, and pane 46 is retained thereby. Openings 40 and 42 are located on opposite sides of pivot bolt 14 between bolt 14 and the respective open end 22 or 24 of tube 12. Together with panes 46, openings 40 and 42 comprise "windows" through which the squirrels or other small animals can view the interior of tube 12 comprising the food reservoir, and thereby see the food therein. The importance of this feature will be explained further below in connection with the explanation of the operation of animal feeder 10.

A pair of metering diaphragms 48 and 50 are received within each respective end of hollow tube 12 outwardly of window openings 40 and 42, and are recessed inwardly from open ends 22 and 24. Preferably, diaphragms 48 and 50 are recessed sufficiently to prevent a squirrel or other small animal from reaching it through the open end of tube 12. Thus, the squirrel is prevented from extracting food through the diaphragm with its paw, and is forced instead to operate feeder 10 in the manner described below. Diaphragms 48 and 50 are oriented in a plane substantially perpendicular to the planes of the walls 28-34 and substantially transverse to the longitudinal axis of tube 12. Each diaphragm 48 and 50 serves to occlude the respective end of tube 12 in which it is disposed and prevents communication of the respective open end 22 or 24 with the central food reservoir of tube 12, except that limited communication is provided by one or more metering apertures 52 in the diaphragm. The number and size of the metering apertures 52 can be varied as is explained further below with respect to FIGS. 6A-6C. Each diaphragm 48, 50 is substantially rectangular and planar, and its edge dimensions correspond generally to the interior transverse dimensions of walls 28-34. The top and bottom edges of diaphragms 48, 50 abut top wall 32 and bottom wall 34, respectively, whereas the vertical edges of diaphragms 48, 50 are received within vertical grooves 54 in front wall 28 and vertical slots 56 in back wall 30. Grooves 54 extend into front wall 28 perpendicular to the plane of front wall 28, and do not extend therethrough. Slots 56, however, extend fully through rear wall 30. As a consequence of this arrangement, it is possible to exchange or replace diaphragms 48, 50 by sliding them into or out of tube 12 through rear slots 56. A pair of pivoted latches 58 are attached to back wall 30 adjacent slots 56 for pivotal motion about an axis perpendicular to the plane of back wall 30. Each latch 58 can be turned about its pivot axis so as to overlie the adjacent slot 56 and thereby retain the diaphragm 48, 50 within tube 12. Friction at the pivot of each latch 58 retains it in its selected orientation relative to back wall 30. Preferably, diaphragms 48, 50 are constructed of transparent material, such as plastic, which allows the squirrels to see the food in the reservoir through the open ends 22 and 24, in addition to seeing the food through the windows 40, 42.

To reduce friction and facilitate pivotal motion of tube 12 relative to upright post 18, a washer 60 is received about the shank of pivot bolt 14 beneath the head thereof and adjacent front wall 28. One or more washers 62 are received about pivot bolt 14 between rear wall 30 and upright post 18. Additional washers can be stacked at each location for spacing purposes if necessary.

Referring in particular to FIG. 5, support frame 16 is shown in greater detail. Support frame 16 comprises upright post 18, which is preferably constructed of rough sawn cedar wood, but can be constructed of other materials such as plastics or metals, if desired. Upright post 18 is of substantially rectangular cross-sectional shape. Affixed to the lower end of post 18 is base 20, comprising four generally radially arranged legs 64, with each leg 64 being attached to a respective one of the four sides of upright post 18. Each leg 64 is generally triangular in shape, tapering outwardly from upright post 18. Each leg is of sufficient horizontal length to provide sufficient spread of base 20 to prevent animal feeder 10 from tipping over during operation as tube 12 "teeters" back and forth.

Operation of animal feeder 10 is as follows. Granular food of a type found desirable by squirrels or other small animals, such as whole corn kernels, sunflower seeds, or the like, are placed into the food reservoir of animal feeder 10 by removing one of the diaphragms 48 or 50, after first turning the retaining latch 58 out of the way, and pouring the granular food into the open end of tube 12. It is desirable that the food reservoir defined between diaphragms 48 and 50 not be filled entirely, since the operation of animal feeder 10 depends in part on the inertial effects of the mass of granular food sliding from end to end within tube 12 as it "teeters". If the reservoir were initially filled, the granular food would be packed in place and would not move significantly during operation. After tube 12 is partially filled, the removed diaphragm is replaced and latched in place, and animal feeder 10 is placed in a location that is accessible to squirrels or other desired small wild animals, and preferably is located within comfortable viewing distance of the human observers.

Squirrels and other naturally curious animals will in due course happen upon animal feeder 10 and will begin to investigate it by climbing on and around it. Soon the animals will discover that there is food inside tube 12, either by viewing it through window openings 40 and 42, or by smelling it through open ends 22 and 24, or both. As the squirrels frolic about animal feeder 10 in an attempt to discover how to obtain the food therein, it is inevitable that one or more of the squirrels will climb upon tube 12. The weight of the squirrel will upset the balance of tube 12 and cause one end to descend rapidly, with the descent of the tube 12 will be abruptly halted as it engages stop block 26. At about that point in time, the food within tube 12 will slide suddenly toward the lower end of tube 12 and crash against the diaphragm. The inertia of the sliding food engaging the diaphragm will cause a certain portion of the food to be propelled through the metering aperture of the lower diaphragm, whereupon the food thus liberated from the food reservoir of tube 12 will fall to the ground through the lower open end of tube 12. Provided that the number and size of the metering orifices has been selected with regard to the size and dry flow characteristics of the granular food placed in tube 12, only a small portion of the food will escape while the greater portion remains in the reservoir. Furthermore, once the initial shock of the sudden descent and stop of the tube 12 has passed, the food within the reservoir will not continue to pour through the metering apertures to any significant degree so long as tube 12 remains undisturbed. After the squirrel has eaten the food which dropped from tube 12, he eventually will climb upon tube 12 again and venture onto the raised end, whereupon the weight of the squirrel will again upset the balance of tube 12 and cause the opposite end to descend and stop suddenly after the fashion of the first encounter. Another portion of food will be dispensed from the opposite end. As the squirrels continue from time to time to accidentally cause tube 12 to "teeter" and dispense food, they will eventually learn that there is a correlation between the motion of tube 12 and the dispensing of food, at which time the squirrels will proceed to intentionally and repeatedly operate animal feeder 12 in "teeter-totter" fashion in order to dispense food for themselves. The antics of the squirrels as they learn to operate animal feeder 10 can be a source of amusement and education in animal behavior for the human observers. In addition, squirrel feeder 10 provides a source of exercise and play for the squirrels, as well as a source of food.

Granular foods of different sizes and dry flow characteristics will require diaphragm metering apertures of different numbers and sizes for most effective operation of animal feeder 10. Therefore, several alternate diaphragms can be associated with animal feeder 10 and exchanged with one another as required by the food used at any particular time. Examples of alternate diaphragms and metering aperture arrangements are shown in FIGS. 6A-6C, wherein the diaphragm of FIG. 6A includes three small apertures, that of FIG. 6B includes two larger apertures, and that of FIG. 6C includes one large aperture. In the preferred embodiment, a diaphragm configured as shown in FIG. 6A is employed, with three spaced apertures arranged in a triangle. Each such aperture is preferably about ⅛ inch in diameter.

While the present invention has been particularly described in terms of a preferred embodiment, it should be understood that no limitation of the scope of the invention is intended thereby, and that the scope of the invention includes variations, uses or adaptations of the invention following the general principles thereof, including such departures from the present disclosure as come within known or customary practice in the art to which this invention pertains, limited only by the claims appended hereto.

What is claimed is:

1. An animal feeder for dispensing granular food particles comprising:
    a support frame;
    an elongate hollow tube having a food reservoir portion and a pair of opposite open ends communicating with said food reservoir portion;
    pivot means connecting said hollow tube to said support frame for permitting pivotal motion of said hollow tube relative to said support frame about a pivot axis disposed substantially transverse to said hollow tube and intermediate the open ends thereof; and, stop means for limiting the range of pivotal motion of said hollow tube.

2. The animal feeder of claim 1, in which said hollow tube is constructed of four walls arranged to provide a substantially rectangular transverse cross-sectional shape.

3. The animal feeder of claim 1, further including a pair of diaphragms, each disposed within said hollow tube proximate a respective open end thereof and forming opposite end walls of said food reservoir portion, each of said pair of diaphragms including a metering aperture therethrough.

4. The animal feeder of claim 1 wherein said pivot axis is substantially horizontal.

5. The animal feeder of claim 1 wherein said stop means is a block disposed on one of said support frame and said hollow tube and cooperating with the other of said support frame and said hollow tube.

6. An animal feeder for dispensing granular food particles comprising:
    a support frame;
    an elongate hollow tube having a food reservoir portion and a pair of opposite open ends communicating with said food reservoir portion;
    pivot means connecting said hollow tube to said support frame for permitting pivotal motion of said hollow tube relative to said support frame about a pivot axis disposed substantially transverse to said hollow tube and intermediate the open ends thereof; and,
    a pair of diaphragms, each disposed within said hollow tube proximate a respective open end thereof and forming opposite end walls of said food reservoir portion, each of said pair of diaphragms including a metering aperture therethrough.

7. The animal feeder of claim 6, and further including stop means, disposed on one of said support frame and said hollow tube and cooperating with the other of said support frame and said hollow tube, for limiting the range of pivotal motion of said hollow tube.

8. The animal feeder of claim 7, in which said support frame includes an upright post and a plurality of generally radially oriented legs.

9. The animal feeder of claim 8, in which said upright post is substantially square in cross-sectional shape and said plurality of legs includes one leg attached to each of the sides of said upright post.

10. The animal feeder of claim 8, in which said hollow tube is constructed of four walls arranged to provided a substantially rectangular transverse cross-sectional shape.

11. The animal feeder of claim 7, and further including a transparent window in said hollow tube exposing to view the interior of the food reservoir of said tube, while retaining food therein.

12. The animal feeder of claim 6, and further including a transparent window in said hollow tube exposing to view the interior of the food reservoir of said tube, while retaining food therein.

13. The animal feeder of claim 6, in which each of said metering diaphragms is disposed substantially transverse to the longitudinal axis of said hollow tube.

14. The animal feeder of claim 13, in which said hollow tube includes a slot therethrough through which said diaphragm can be inserted into and removed from said hollow tube.

15. The animal feeder of claim 14, an further including retaining means cooperating with said slot for retaining said diaphragm within said hollow tube.

16. The animal feeder of claim 6, in which said pivot means includes a pivot bolt pivotally connected to said hollow tube and fixedly connected to said support frame.

17. The animal feeder of claim 16, in which said support frame includes an upright post and a plurality of generally radially oriented legs.

18. The animal feeder of claim 16, in which said pivot bolt passes through aligned holes in said hollow tube.

19. The animal feeder of claim 12, including a pair of windows, one located on each side of said pivot means between said pivot means and a respective open end of said hollow tube.

20. The animal feeder of claim 12, in which said pivot means includes a pivot bolt pivotally connected to said hollow tube and fixedly connected to said support frame.

* * * * *